INVENTOR
HERBERT J. HAUSER JR.

United States Patent Office 3,395,552
Patented Aug. 6, 1968

3,395,552
POWER TRANSMITTING FLEXIBLE
COUPLING
Herbert J. Hauser, Jr., East Moline, Ill., assignor to American Air Filter Company, Inc., Louisville, Ky., a corporation of Delaware
Filed Feb. 1, 1966, Ser. No. 524,189
4 Claims. (Cl. 64—11)

ABSTRACT OF THE DISCLOSURE

A flexible coupling to transmit power from a driving member to a driven member which includes a tubular flexible outer member connected to the driving member and the driven member and a stiff insert disposed within the flexible member so that the outer periphery of the stiff member contacts the inner periphery of the flexible member.

*Background of the invention*

Figure 1:
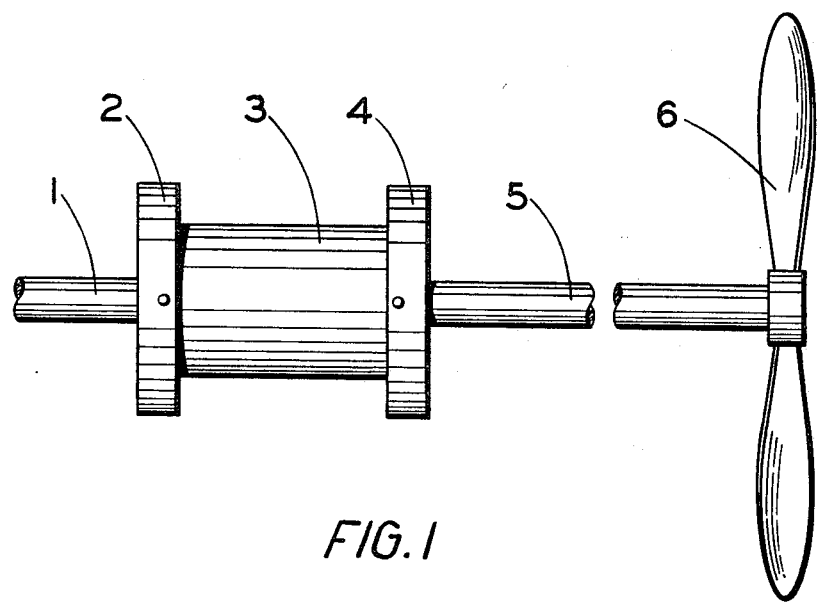

In the operation of power-driven equipment, vibration and shock occurring in the driving or driven elements are transmitted from one such element to the other through the shaft connections. Furthermore, in starting and stopping such power-driven equipment, certain resonant frequencies are attained and cause vibrations which are transmitted from the power source to the driven equipment through the drive shaft and coupling, or vice versa. These resonant frequencies build upon themselves in transmission and can reach destructive proportions. Previous flexible couplings for connecting driving shafts to driven shafts have been effective to prevent transmission of shock, which is readily transmitted by rigid couplings, from one element to the other. However, such previous flexible couplings have not effectively eliminated the transmission of vibration resulting from operation at resonant frequencies.

*Summary of the invention*

In accordance with the novel and advantageous features of the present invention, a flexible coupling is provided to connect rotating shafts and transmit power from a driving shaft to a driven shaft, the flexible coupling of the present invention preventing the transmission from the driving to the driven shafts of vibrations resulting from operation at resonant frequencies. Furthermore, it has been found that the economical and useful flexible coupling, in accordance with the present invention, actually dampens such resonant frequency vibrations without impairing the advantageous feature of preventing the transmission of shock from the driving shaft to the driven shaft and vice versa.

Various other features of the present invention will become obvious to one skilled in the art upon reading the disclosure set forth hereinafter.

More particularly, the present invention provides a rotating shaft coupling comprising: a tubular shaped flexible member including a first end to be cooperatively joined to a driving shaft and a second end to be cooperatively joined to a driven shaft to transmit rotary motion from the driving shaft to the driven shaft, and a stiff insert sized to fit inside the tubular member in contiguous relation with the inner surface of the tubular member and extend substantially the length of the tubular member.

It is to be understood that various changes can be made by one skilled in the art in the arrangement, form and construction of the flexible coupling disclosed herein without departing from the scope or spirit of the present invention.

Figure 2:
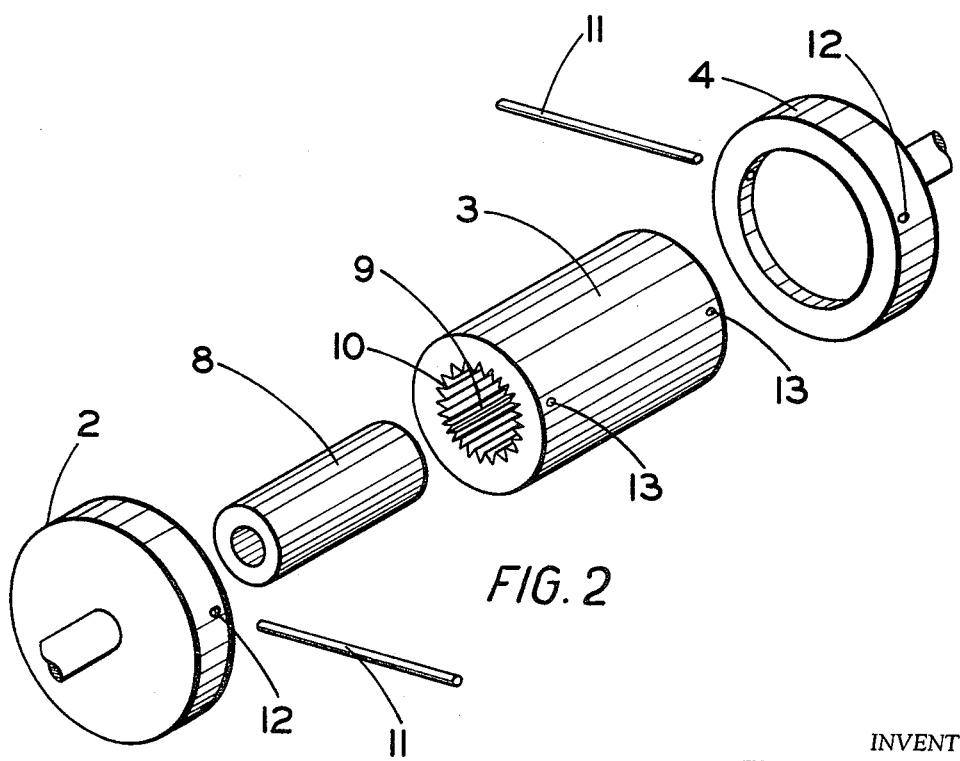

Referring now to the drawing which shows one advantageous embodiment of the present invention:

FIGURE 1 is a side view of a flexible coupling in accordance with the present invention; and FIGURE 2 is an exploded perspective view of the coupling of FIGURE 1 showing the separated parts of the coupling.

FIGURE 1 is an illustration of a flexible coupling in accordance with the present invention and shows a drive shaft 1 connected to a driven shaft 5 by a flexible coupling including hollow flexible member 3 which can be made of a suitable rubber-like material.

Drive shaft 1 can be turned by any suitable source of power (not shown), for example, an internal combustion engine or an electric motor. Any suitable means can be used to join flexible member 3 to the rotating shafts, and in the illustration of this example of the invention, flange 2 is joined to drive shaft 1, for example by welding, to cooperatively receive one end of flexible member 3 in a recess thereof. Member 3 is held in fast relation in flange 2 by any suitable means, for example by pin 11 inserted through hole 12 in flange 2 and hole 13 in flexible member 3. The other end of flexible member 3 is adapted to be similarly held by flange member 4 joined to drive shaft 5 in a similar fashion to transmit power to equipment operated by the power source, for example, a fan 6.

In the example of the present invention shown in FIGURE 2, flexible element 3, which is designed to transmit power from drive shaft 1 to driven shaft 5 is, advantageously, in the shape of a hollow right cylinder. In accordance with the present invention, a stiff sleeve 8 is inserted in the cooperative aperture in hollow member 3 so the outside of sleeve 8 is contiguous with inner side of flexible member 3, but sleeve 8 is not as long as flexible member 3. Inner side of flexible member 3 can, advantageously include longitudinally-extending serrations 9 as shown in FIGURE 2. Serrations 9 have peaks 10 so the inner diameter of hollow flexible member 3, as measured across peaks 10, is smaller than the outer diameter of stiff sleeve 8. Therefore, peaks 10 press directly on the outer surface of stiff sleeve 8 when sleeve 8 is inserted in flexible member 3.

Stiff sleeve 8 can, advantageously, be of any material less resilient than flexible member 3, for example, including but not limited to, plastic such as Teflon, nylon or polyethylene.

In accordance with the apparatus of the present invention, flexible member 3 transmits rotational energy of driving shaft 1 to driven shaft 5 and absorbs shock which would normally be transmitted from driving shaft 1 to the driven shaft 5, or vice versa. Flexible member 3 also allows compensation for slight misalignment in the shafts. Furthermore, in accordance with the present invention, stiff sleeve 8 in contiguous relation with inner surface of flexible member 3 dampens resonant frequencies occurring at certain speeds in starting and stopping driving and driven shafts 1 and 5 and prevents the transmission of such resonant frequencies from one shaft to the other through flexible member 3.

The invention claimed is:

1. A rotating shaft coupling comprising a tubular shaped resilient member with multiple serrations along the inner surface thereof, and having a first end to be cooperatively joined to a driving shaft and a second end to be cooperatively joined to a driven shaft to transmit rotary motion from said driving shaft to said driven shaft; and, a stiff insert disposed within said resilient tubular member so the outer surface of the stiff insert is in contiguous relation with the serrations of the inner surface of said resilient tubular member.

2. The apparatus of claim 1 wherein said stiff insert extends substantially from said first to said second end of said resilient member.

3. The apparatus of claim 1 wherein serrations extend substantially parallel the longitudinal axis of said tubular member.

4. A rotating sehaft coupling comprising: a tubular shaped elastomeric member having a first end to be cooperatively joined to a driving shaft and a second end to be cooperatively joined to a driven shaft to transmit rotary motion from said driving shaft to said driven shaft; and, a stiff insert disposed within said resilient tubular member to contact only the inner surface of said tubular member.

References Cited

UNITED STATES PATENTS

| | | | |
|---|---|---|---|
| 1,458,894 | 6/1923 | Schwarz | 64—11 |
| 1,784,436 | 12/1930 | Hadley | 64—1 |
| 2,001,167 | 5/1935 | Swennes | 64—1 |
| 2,751,765 | 6/1956 | Rowland et al. | 64—1 |
| 3,052,107 | 9/1962 | Kempf | 64—1 |
| 3,075,406 | 1/1963 | Butler et al. | 74—574 |
| 3,145,464 | 8/1964 | Green | 64—11 X |

FOREIGN PATENTS 808,017    7/1951    Germany.

HALL C. COE, *Primary Examiner.*